United States Patent [19]

Horigome et al.

[11] Patent Number: 4,458,317
[45] Date of Patent: Jul. 3, 1984

[54] TELLER MACHINE HAVING AN ALTERABLE SECONDARY MEMORY

[75] Inventors: Koichi Horigome, Nara; Seizo Okada, Osaka; Katsuji Nishimura, Habikino; Hachizou Yamamoto, Nara, all of Japan

[73] Assignee: Sharp Kabushiki Kaisha, Osaka, Japan

[21] Appl. No.: 393,341

[22] Filed: Jun. 29, 1982

Related U.S. Application Data

[63] Continuation of Ser. No. 43,833, May 30, 1979, abandoned.

[30] Foreign Application Priority Data

Jun. 1, 1978 [JP] Japan .................................. 53-66396

[51] Int. Cl.³ ............................................ G06F 15/30
[52] U.S. Cl. ..................................... 364/406; 364/405
[58] Field of Search ............... 364/406, 405, 404, 737, 364/200, 900

[56] References Cited

U.S. PATENT DOCUMENTS 4,001,568 1/1977 Iizuka et al. ......................... 364/406
4,095,738 6/1978 Masuo ................................ 364/405

OTHER PUBLICATIONS

Desilets et al., "Entry Playback Function for Hand-Held Calculators" *IBM Tech. Disclosure Bulletin*, vol. 19, No. 3, Aug. 1976, pp. 941-942.

Primary Examiner—David H. Malzahn
Attorney, Agent, or Firm—Birch, Stewart, Kolasch & Birch

[57] ABSTRACT

A teller machine is capable of modifying information stored within a secondary memory when the operator realizes a mistake even after he has completed transactions and placed information with respect to these transactions into the secondary memory. In the teller machine, a primary memory stores numerical information representative of amounts of money after each transaction and a secondary memory stores cumulative amounts of money for all transactions.

2 Claims, 3 Drawing Figures

TELLER MACHINE HAVING AN ALTERABLE SECONDARY MEMORY

This application is a continuation, of copending application Ser. No. 43,833, filed on May 30, 1979 now abandoned.

BACKGROUND OF THE INVENTION

This invention relates to an improvement in teller machines for use in the field of banking, and more particularly teller machines having an alterable secondary memory.

Some types of conventional teller machines include a primary memory for storing numerical information representative of amounts of money involved in each transaction and a secondary memory for storing cumulative amounts of money for all transactions. For instance, the bank teller receives cash for 60,000.-yen and check for 50,000.-yen, a total of 110,000.-yen. Assume that the teller has manipulated the teller machine inadvertently as if he received cash for 50,000.-yen and check for 50,000.-yen with a total of 100,000.-yen. It is well known in the art that, once a money receipt transaction is completed, information representative of the amount of the money received is registered in a cumulative fashion into a secondary memory. Even though the teller realizes the mistake later, conventional teller machines do not allow any alternations or corrections in the contents of the secondary memory. Therefore, the teller must enter a record of the error into a journal or the like. Therefore, the data must be corrected manually while looking over the journal or the like at day's end.

OBJECTS AND SUMMARY OF THE INVENTION

It is therefore an object of the present invention to provide a teller machine which is capable of modifying information stored within a secondary when the operator realizes a mistake even after he has completed transactions and placed information with respect to these transactions into the secondary memory.

According to the teachings of the present invention, a teller machine comprises an input means for introducing numerical information representative of amounts of money, etc. and conditional or functional information representative of the kind of money such as cash, check, etc; an arithmetic processor means for performing arithmetic calculations, transmissions, etc. of the numerical information; an output means for delivering the entry of inputs or numerical information representative of the results of the arithmetic calculations; a primary memory means for storing numerical information representative of the amounts of money at each transaction; a secondary memory means for storing a cumulative value of a series of the numerical information stored within said primary memory means, and means for allowing the contents of said secondary memory means to be modified.

For a more complete understanding of the present invention and for further objects and advantages thereof, reference is now made to the following description taken in conjunction with the accompanying drawings, in which.

DETAILED DESCRIPTION OF THE INVENTION

Figure 1:
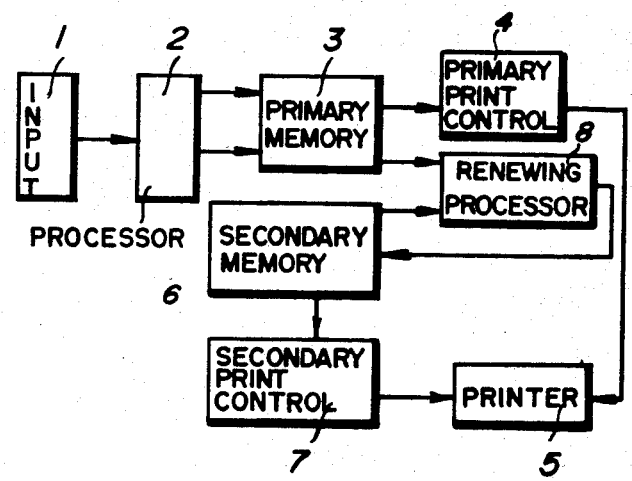
FIG. 1 is a schematic diagram of a basic structure of a teller machine.

Referring now to FIG. 1, there is illustrated a basic structure of a teller machine useful in the field of banking. An input means 1 includes a family of digit keys for introduction of numerical information representative of amounts of money, quantities, numbers, etc., several type keys for information indicative of the kind of money, for example, cash and check, transaction keys for indicating at the end of a transaction what transaction has been processed, mode selectors for selecting the registration mode, the total clearing mode, etc., and so on. An arithmetic processor 2 performs arithmetic operations on input information introduced via the input means 1 or transmits the same. A primary memory 3 stores temporarily a variety of information until one transaction is completed. The primary memory 3 comprises X and Y registers for arithmetic operation use, an account number register, a money kind register, a money amount register, a check register for storing the amount and number of checks, and so on. The contents of the primary memory 3 is printed onto a slip or a receipt via a primary print control 4 by the action of a printer 5. In addition, a secondary memory 6 stores a variety of various cumulative data (a daily total of the amounts of money received, a daily total of the amounts of money paid, a daily total of the amounts of checks and a daily total of the number of checks, etc.). The cumulative data including totals and subtotals are printed by the printer 5 via a secondary print control 7. At the end of each transaction the contents of the primary memory 3 are added to the contents of the secondary memory 6 via a secondary renewing processor 8, the results of the additions being loaded into the secondary memory 6.

Figure 2:
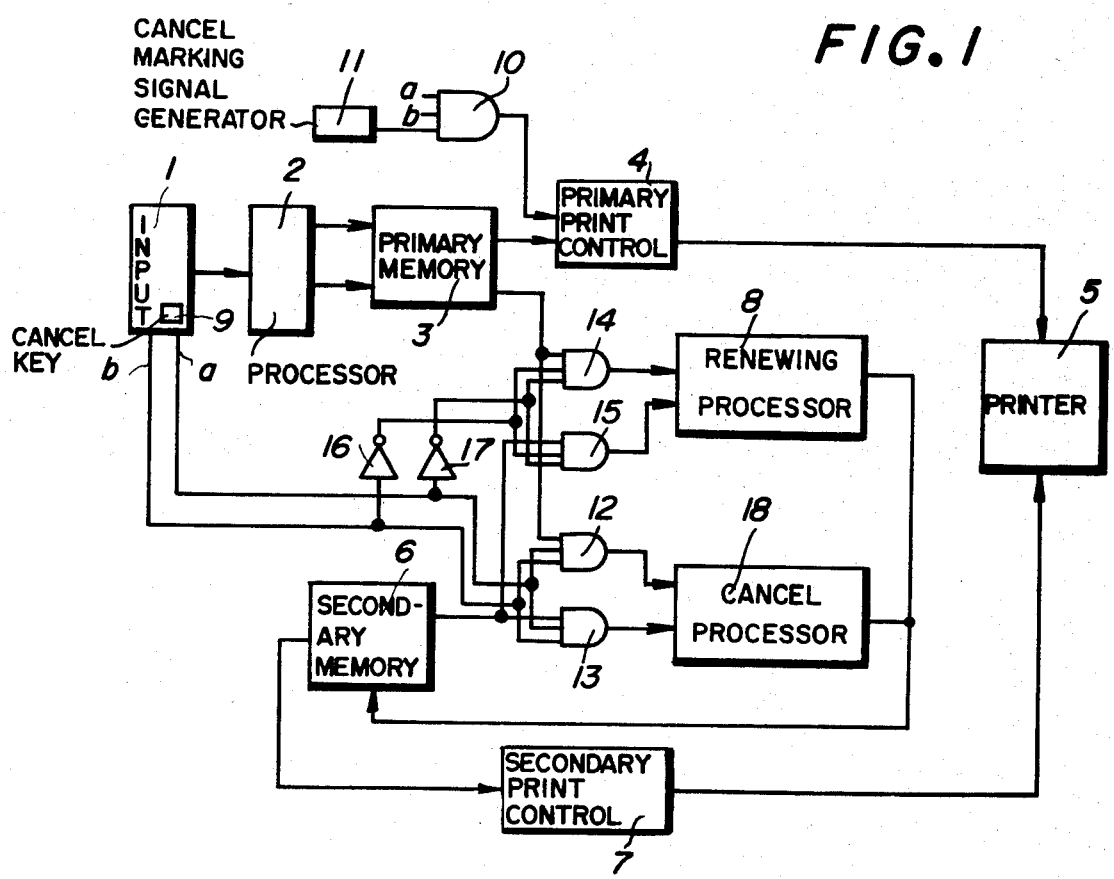
FIG. 2 is a block diagram of a teller machine embodying the present invention.
Figure 3:
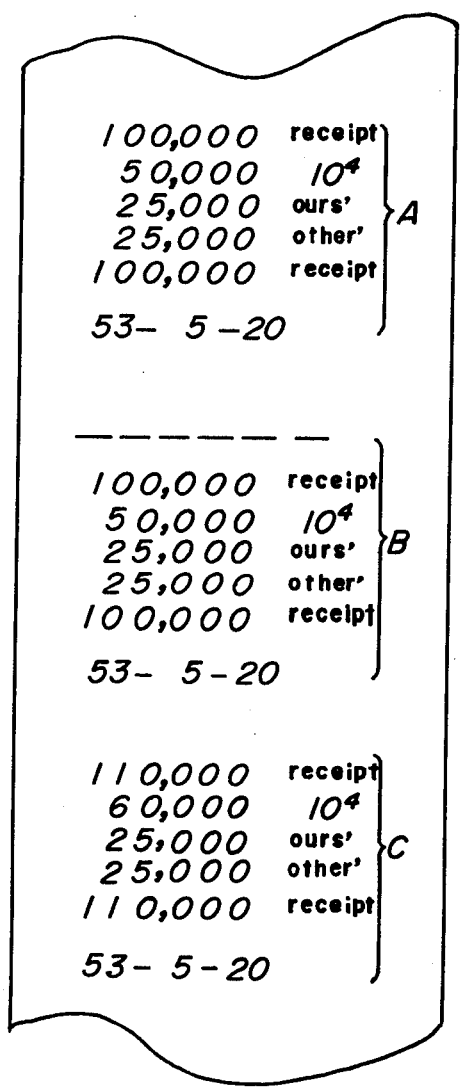
FIG. 3 shows an example of a journal issued when cancellation of a transaction is achieved according to the present invention.

Details of a teller machine in one preferred embodiment of the present invention is shown in FIGS. 2 and 3. As stated in the given example, in the case where the operator registered into the teller machine a money receipt transaction in the form of cash for 50,000.-yen and check for 50,000.-yen though he actually received cash for 60,000.-yen and check for 50,000.-yen. As indicated in the section A in FIG. 3, there are printed on a journal or a slip an amount of money received of 100,000 yen, particulars of money received (50,000 yen by cash, 25,000 yen by ours' check, and 25,000 yen by another bankers' check) and data of transaction, May 20, 1978.

When the operator realizes an error in the entry of a transaction after the completion of the money receipt transaction, the operator himself or the manager brings the mode selector on the input means or keyboard into a clear mode and then pushes a cancel key 9 within the function keys on the input means 1. As a result, a high level signal "H" is developed at signal lines "a" and "b" so that an AND logic gate 10 becomes operative to enable a cancel marking signal to be trasmitted from a cancel marking signal generator 11 to the primary print control 4 therethrough, thus printing a cancel marking "- - -" on the journal by the printer 5 as indicated in the section B of FIG. 3. Simultaneously, AND logic gates 14, 15 are inhibited to operate via inverters 16, 17, thus making AND logic gates 12, 13 operative. Under these circumstance the operator enters again the previously introduced erroneous input information into the arithmetic processor 2 via the input means 1 so that the primary memory 3 stores an amount of received money of 100,000 yen item by item (50,000 yen by cash, 25,000 yen by our check and 25,000 yen by other bankers check). Subsequent to this, the operator introduces a signal indicative of the completion of the money receipt transaction via the input means 1 into the arithmetic processor unit 2. The processor unit 2 then checks whether the newly introduced information is in agreement with the previous information as to the total amount and particulars. If there is agreement, all the information concerning the money receipt transaction contained within the primary memory 3 is printed onto the journal via the print control 4 by the printer 5 and transmitted into a cancel processor 18 via the AND logic gate 12. The printing result is illustrated in FIG. 3 B.

The previous information concerning the money receipt transaction to be canceled is subtracted from the cumulative data contained within the secondary memory 6, via the AND logic gate 13. The result of this subtraction, namely, the cumulative data of money received not containing the previously introduced erroneous data is reapplied to and stored within the secondary memory 6. If the erroneous record of the money receipt transaction is canceled in this way, then the operator releases the clear mode by the input means 1. At this time the signal lines "a" and "b" are at a low level voltage such that the AND logic gates 10, 12, 13 are inhibited but the AND logic gates 14, 15 become operative via the inverters 16, 17.

Thereafter, when the operator introduces correct information concerning money received (a total amount of money received, 110,000 yen, particulars: cash for 60,000 yen; our account check for 25,000 yen; and another bank's account check for 25,000 yen) via the input means 1, this information is then loaded into the primary memory 3. Upon the operator's actuation of a key indicating the completion of the input operation the arithmetic processor 2 decides whether the new information agrees with the previous one as to the total amount and particulars thereof. If the affirmative answer is provided, the new and correct information is printed via the primary print control 4 by the printer 5 as indicated in the section C of FIG. 3 and at the same time introduced into the secondary renewing processor 8 via the AND logical gate 14. The information concerning the money receipt transaction contained within the secondary renewing processor 8 is added to the cumulative information which is transmitted from the secondary memory 6 to the renewing processor 8 via the AND logic gate 15, the result of the addition being loaded back to the secondary memory 6.

Although in the above illustrated embodiment the cancellation is effected after each money receipt transaction, etc., all erroneous records of transactions may be canceled and corrected at daily clearing time when a note is put down in the journal each time the operator is aware of his error. The teller machine may employ a microprocessor having a combination of a CPU, a ROM and a RAM. In this case a predetermined flag is inserted for the cancellation step and the secondary renewing processor 8 and the cancellation processor 18 are selectively employed according to whether the flag is present.

As stated above, according to the present invention, the operator or the manager can correct the contents of the secondary memory in substantially the same manner as in conventional transactions when transactions are recorded by mistake.

Whereas the present invention has been described with respect to specific embodiments thereof, it will be understood that various changes and modifications will be suggested to one skilled in the art, and it is intended to encompass such changes and modifications as fall within the scope of the appended claims.

We claim:
1. A teller machine comprising:
input means for introducing numeral and function individual transaction data of each individual transaction introduced into said teller machine;
processing means responsive to said individual transaction data introduced by said input means for performing calculations for each individual transaction and thereby producing transaction results;
first memory means responsive to said processor means for storing therein the individual transaction data and transaction results of each individual transaction;
second memory means responsive to said first memory means for storing a cumulative representation of all transaction results performed over a period of time;
said input means introducing error information related to errors made in the introduction of individual transaction data of at least one individual transaction;
said processor means comparing said error information with said individual transaction data stored in said first memory to detect a coincidence with said individual transaction data;
modification means responsive to said input means for correcting the transaction data and transaction results of said at least one individual transaction having data erroneously entered, said modification means including,
  means responsive to said input means and the detection of a coincidence by said processor means for subtracting said transaction results of said erroneous individual transaction from said cumulative representation in said second memory means,
  means responsive to said input means for adding the transaction results produced by said corrected transaction information to said cumulative representation in said memory means, and
  switch-over means for enabling said means for adding after said erroneous transaction results are subtracted by said means for subtracting;
cancel marking generator means responsive to the operation of said modification means for producing a cancel marking on the printed transaction results;
means responsive to said input means for retrieving and printing the transaction results stored in said first memory means and the cumulative representation of teller transaction results stored in said second memory means.

2. The teller machine of claim 1 wherein said input means includes a transaction correction key; and
wherein said switch-over means includes;
first and second pairs of AND gates; and
first and second inverters;
a first input of one of said AND gates of each pair being connected to said first memory means;

a first input of the other of said AND gates of each pair being connected to said second memory means; the second input of each of said AND gates being connected to the transaction correction correction key through said first and second inverters, said key producing a high signal when correction is desired;

the output of said AND gates of one pair being connected to an input of said means for adding and the output of said AND gates of said other pair being connected to an input of said means for subtracting.

* * * * *